United States Patent
Feldmann et al.

(10) Patent No.: US 6,666,992 B2
(45) Date of Patent: Dec. 23, 2003

(54) PLASMA DISPLAY WITH BLUE PHOSPHOR

(75) Inventors: Claus Feldmann, Aachen (DE); Thomas Juestel, Aachen (DE); Cornelis Reinder Ronda, Aachen (DE); Walter Mayr, Alsdorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 26 days.

(21) Appl. No.: 10/143,645

(22) Filed: May 10, 2002

(65) Prior Publication Data

US 2002/0190240 A1  Dec. 19, 2002

(30) Foreign Application Priority Data

May 12, 2001  (DE) .......................... 101 23 236

(51) Int. Cl.$^7$ ..................... C09K 11/64; C09K 11/80
(52) U.S. Cl. ................. 252/301.4 R; 313/582; 313/584
(58) Field of Search ............... 252/301.4 R; 313/582, 313/584

(56) References Cited

FOREIGN PATENT DOCUMENTS

| JP | 2002-097466 | * | 4/2002 | |
| WO | WO 9934389 | | 7/1999 | ............ H01J/17/49 |

* cited by examiner

*Primary Examiner*—C. Melissa Koslow
(74) *Attorney, Agent, or Firm*—Eric M. Bram

(57) ABSTRACT

A plasma display with a carrier plate, a transparent front plate, a ribbed structure which subdivides the space between the carrier plate and the front plate into plasma cells, which cells are filled with a gas, with one or several electrode arrays for generating corona discharges in the plasma cells, and with a phosphor layer which comprises a phosphor chosen from the group of doped europium(II)-activated barium-magnesium aluminates with the general formula $Ba_{1-x}M_xMgAl_{10}O_{17-0.5x}$:Eu with $0<x\leq0.5$ and M=Li, Na, K, Rb and Cs;

Figure 1:
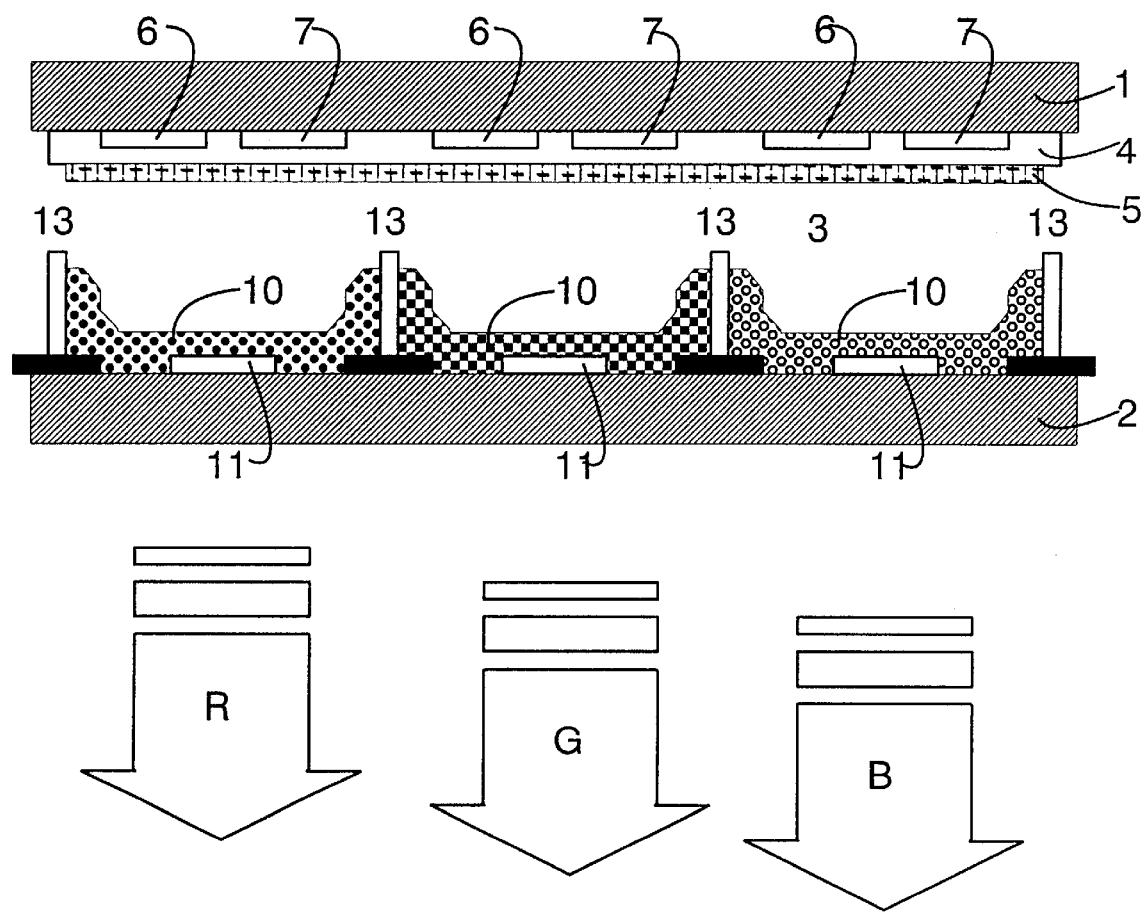

$BaMg_{1-y}M_yAl_{10}O_{17-0.5y}$:Eu with $0<y\leq0.5$ and M=Li, Na, K, Rb and Cs; and $BaMgAl_{10-z}N_zO_{17-0.5z}$:Eu with $0<z\leq5.0$ and N=Mg, Ca, Sr, Ba and Zn has an improved blue color point and color contrast.

The invention also relates to a phosphor chosen from the group of doped europium(II)-activated barium-magnesium aluminates with the general formula $Ba_{1-x}M_xMgAl_{10}O_{17-0.5x}$:Eu with $0<x\leq0.5$ and M=Li, Na, K, Rb and Cs;

$BaMg_{1-y}M_yAl_{10}O_{17-0.5y}$:Eu with $0<y\leq0.5$ and M=Li, Na, K, Rb and Cs; and $BaMgAl_{10-z}N_zO_{17-0.5z}$:Eu with $0<z\leq5.0$ and N=Mg, Ca, Sr, Ba and Zn

3 Claims, 1 Drawing Sheet

PLASMA DISPLAY WITH BLUE PHOSPHOR

The invention relates to a plasma display provided with a carrier plate, a transparent front plate, a ribbed structure which subdivides the space between the carrier plate and the front plate into plasma cells, which cells are filled with a gas, with one or several electrode arrays for generating corona discharges in the plasma cells, and with a phosphor layer which comprises a blue-emitting phosphor from the group of doped, europium-activated barium-magnesium aluminates.

The basic principle of a plasma display is that a high voltage generates electromagnetic radiation in a gas of low gas pressure, which radiation may itself be visible or may be converted into visible light by phosphors.

In a color plasma display of conventional construction, the gas filling consists of a rare gas, for example xenon or a rare gas mixture, for example a mixture of helium, neon, and xenon. Ultraviolet radiation in the VUV range is generated in the discharge, i.e. with a wavelength below 200 nm. This VUV radiation excites the red-, green-, and blue-emitting phosphors (RGB phosphors) in the phosphor layer such that they radiate visible light in the colors red, green, and blue. The luminescent materials in plasma displays accordingly utilize the high-energy side of the UV spectrum, unlike conventional fluorescent lamps. The VUV emission may vary between a single line at 147 nm and a wide band around 172 nm, depending on the composition of the rare gas mixture and the gas pressure. This results in new requirements being imposed on the RGB phosphors in a plasma display.

The RGB phosphors are the final link in the energy transfer chain in which electrical energy is converted into visible light in the plasma display. The efficacy of a plasma display with a phosphor layer depends crucially on the electro-optical efficacy of the phosphors, i.e. to what extent the generated UV radiation is absorbed in the phosphor and to what extent subsequently the generated visible light leaves the plasma display in the direction of a viewer.

Among the blue-emitting phosphors, europium(II)-activated barium-magnesium aluminate is unsurpassed as regards its color properties and its electro-optical efficacy. A problem, however, is its comparatively strong degradation under the influence of VUV radiation. The degradation is particularly strong under the influence of VUV radiation with a wavelength below 200 nm and manifests itself in a deterioration of the electro-optical efficacy and in a shift of the color point into the green region.

WO 99/34389 discloses a plasma display with a phosphor having the general formula $Ba_{1-e}Eu_eMn_mMg_{1+\delta-m}Al_{10+2f}O_{17+\delta+3f}$, for which the color shift is smaller throughout the life of the display.

The degradation and color shift of the europium(II)-activated barium-magnesium aluminate, however, starts as early as in the manufacture of the plasma display, during which the phosphor layer is exposed to temperatures of 500° C. and more.

It is an object of the present invention to provide a plasma display provided with a carrier plate, a transparent front plate, a ribbed structure which subdivides the space between the carrier plate and the front plate into plasma cells, which cells are filled with a gas, with one or several electrode arrays for generating corona discharges in the plasma cells, and with a phosphor layer which comprises a blue-emitting phosphor from the group of doped, europium-activated barium-magnesium aluminates, which has an improved, natural color rendering and a higher brightness.

According to the invention, this object is achieved by means of a plasma display with a carrier plate, a transparent front plate, a ribbed structure which subdivides the space between the carrier plate and the front plate into plasma cells, which cells are filled with a gas, with one or several electrode arrays for generating corona discharges in the plasma cells, and with a phosphor layer which comprises a phosphor chosen from the group of doped europium(II)-activated barium-magnesium aluminates with the general formula $Ba_{1-x}M_xMgAl_{10}O_{17-0.5x}$:Eu with $0<x\leq0.5$ and M=Li, Na, K, Rb and Cs;

$BaMg_{1-y}M_yAl_{10}O_{17-0.5y}$:EU with $0<y\leq0.5$ and M=Li, Na, K, Rb and Cs; and $BaMgAl_{10-z}N_zO_{17-0.5z}$:Eu with $0<z\leq5.0$ and N=Mg, Ca, Sr, Ba and Zn The blue point has been shifted for a better color saturation in such a plasma display. This influences not only the blue tints, but also all intermediate tints on the lines from blue to green and from blue to red, which become achievable through the enlargement of the color rendering triangle in the blue region. Many color nuances can thus be represented more naturally, which difference is visible. In addition, the color contrast is enhanced at a high ambient brightness.

It is preferred for the present invention that the blue-emitting phosphor comprises 1 to 30 mole % europium(II).

The invention also relates to a phosphor chosen from the group of doped europium(II)-activated barium-magnesium aluminates with the general formula $Ba_{1-x}M_xMgAl_{10}O_{17-0.5x}$:Eu with $0<x\leq0.5$ and M=Li, Na, K, Rb and Cs;

$BaMg_{1-y}M_yAl_{10}O_{17-0.5y}$:Eu with $0<y\leq0.5$ and M=Li, Na, K, Rb and Cs; and $BaMgAl_{10-z}O_{17-0.5z}$:Eu with $0<z\leq5.0$ and N=Mg, Ca, Sr, Ba and Zn This phosphor is characterized by an improved thermal resistance, in particular in an atmosphere containing oxygen, because the oxidation of the Eu(II) to Eu(III) becomes less. The luminance of this phosphor accordingly does not deteriorate during the manufacture of the plasma display, and the efficacy remains constant for a long time, also under excitation by VUV radiation.

The invention will be explained in more detail below with reference to a FIGURE and two embodiments.

FIG. 1 diagrammatically shows a plasma display in cross-section.

The excitation into luminescence by the UV radiation of a gas discharge is the basic principle of all types of plasma displays. Plasma displays may be subdivided into DC-addressed displays and AC-addressed displays. These differ in their manner of current limitation.

FIG. 1 shows a plasma cell of an AC plasma display by way of example. Such an AC plasma display is composed of a transparent front plate 1 and a carrier plate 2 which are kept at a distance from one another and are hermetically sealed along their peripheries. The space between the two plates forms the discharge space 3 which is bounded by the protective layer and the phosphor layer. Usually, both the front plate and the carrier plate are made of glass. Individually controllable plasma cells are formed by a ribbed structure 13 with separating ribs. A plurality of transparent picture electrodes 6, 7 are arranged in strips on the front plate. The associated control electrodes 11 are provided on the carrier plate perpendicular to the former, such that a discharge can be ignited at each of the points of intersection.

The discharge space is filled with a suitable discharge gas, for example with xenon, a gas comprising xenon, neon, or a gas comprising neon. The gas discharge is ignited between the picture electrodes 6, 7 on the front plate. To avoid a direct contact between the plasma and the picture electrodes 6, 7 the latter are covered with a dielectric layer 4 and a protective layer 5. The gas is ionized in the discharge zone, and a plasma which emits VUW radiation is created.

The spectral intensity of the gas discharge changes in dependence on the composition of the gas. Gas mixtures containing less than 30% by volume of xenon emit mainly resonance radiation at 147 nm, whereas gas mixtures with more than 30% by volume of xenon emit the excimer radiation at 172 nm.

The emitted VUV radiation excites red, green, and blue phosphors structured in a pixel array into the emission of light in the visible range, whereby a color impression is created. The pixels of the display in the three primary colors red, blue, and green are realized by a phosphor layer 10 on at least a portion of the carrier plate and/or on the walls of the separating ribs in the plasma cells. The plasma cells are coated alternately with a red, green, or blue phosphor. Three plasma cells lying next to one another represent one pixel with which the display of all colors is possible through mixing of the three primary colors.

The phosphors for generating the blue color with the general formula

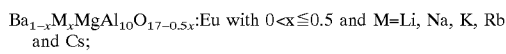

$Ba_{1-x}M_xMgAl_{10}O_{17-0.5x}$:Eu with $0<x\leq 0.5$ and M=Li, Na, K, Rb and Cs;

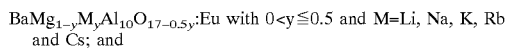

$BaMg_{1-y}M_yAl_{10}O_{17-0.5y}$:Eu with $0<y\leq 0.5$ and M=Li, Na, K, Rb and Cs; and

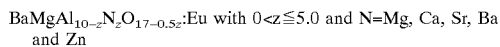

$BaMgAl_{10-z}N_zO_{17-0.5z}$:Eu with $0<z\leq 5.0$ and N=Mg, Ca, Sr, Ba and Zn consist of a host lattice which is doped with the activator ion $Eu^{2+}$ in a concentration between 1 and 30 mole %, preferably 5 mole %, as does the conventional phosphor $BaMgAl_{10}O_{17}$:Eu.

The cations of the conventional phosphor are partly replaced by a cation with a lower valency. The bivalent cations of barium(II) and magnesium(II) may be partly substituted by the alkali metal cations of lithium, sodium, potassium, rubidium, and cesium which occupy the same lattice locations in the host lattice. The trivalent cation of aluminum may be partly replaced by the bivalent cations of the elements magnesium, calcium, strontium, barium, and zinc, which will also occupy the locations of the aluminum in the host lattice. Such a substitution is also denoted p-substitution.

The doped europium(II)-activated barium-magnesium aluminates are prepared by conventional methods, for example by a solid state reaction. The oxides or carbonates are used as the starting compounds. They are mixed, milled, and subsequently sintered. Phosphors are obtained with a uniform crystal structure in the form of fine-grain particles with a grain size of 1 to 10 μm.

Suitable manufacturing methods for the phosphor layer are dry coating methods, for example electrostatic deposition or electrostatically supported dusting, wet coating methods, for example silk screen printing, as well as dispenser methods in which a suspension is introduced by a nozzle moving along the channels, or sedimentation from the liquid phase.

For the wet coating methods, the phosphors are to be dispersed in water, an organic solvent, possibly in combination with a dispersing agent, a surfactant, and an antifoaming agent, or a binder preparation. Organic and inorganic binders capable of withstanding an operating temperature of 250° without decomposition, brittling and discoloration are suitable for binder preparations for plasma displays.

The invention was described above with reference to an AC color plasma display, but its application is not limited to this type of displays; indeed, it may also be used, for example, for DC color plasma displays and for monochrome AC and DC plasma displays.

Embodiment 1

For the manufacture of $Ba_{0.5}K_{0.5}MgAl_{10}O_{16.75}$:Eu, 28.1 g $Al_2O_3$, 1.54 g MgO, 7.04 g $BaCO_3$, 1.00 g $Eu_2O_3$, 1.05 g $MgF_2$ and 1.93 g $K_2CO_3$, are thoroughly mixed and introduced into a corundum crucible. This is heated up in a tubular furnace in a reducing gas flow of 95% nitrogen and 5% hydrogen to a temperature of 1250° C. within one hour. This temperature is maintained for two hours. Then water vapor is added to the reducing gas flow and heating continues for one more hour at 1250° C. Then the compound is allowed to cool down to room temperature in the reducing gas flow. A phosphor is obtained with the composition $Ba_{0.5}K_{0.5}MgAl_{10}O_{16.75}$:Eu.

A plasma display was constructed by known methods with the phosphor thus prepared and was tested.

Embodiment 2

For the manufacture of $Ba_{0.9}K_{0.1}MgAl_{10}O_{16.95}$:Eu, 28.1 g $Al_2O_3$, 1.54 g MgO, 8.69 g $BaCO_3$, 1.00 g $Eu_2O_3$, 1.05 g $MgF_2$ and 0.39 g $K_2CO_3$ are thoroughly mixed and introduced into a corundum crucible. This is heated up in a tubular furnace in a reducing gas flow of 95% nitrogen and 5% hydrogen to a temperature of 1250° C. within one hour. This temperature is maintained for two hours. Then water vapor is added to the reducing gas flow and heating continues for one more hour at 1250° C. Then the compound is allowed to cool down to room temperature in the reducing gas flow. A phosphor is obtained with the composition $Ba_{0.9}K_{0.1}MgAl_{10}O_{16.95}$:Eu.

A plasma display was constructed by the known method with the phosphor thus prepared and was tested.

What is claimed is:

1. A plasma display with a carrier plate, a transparent front plate, a ribbed structure which subdivides the space between the carrier plate and the front plate into plasma cells, which cells are filled with a gas, with one or several electrode arrays for generating corona discharges in the plasma cells, and with a phosphor layer which comprises a phosphor chosen from the group of doped europium(II)-activated barium-magnesium aluminates with the general formula

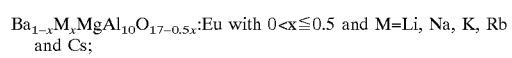

$Ba_{1-x}M_xMgAl_{10}O_{17-0.5x}$:Eu with $0<x\leq 0.5$ and M=Li, Na, K, Rb and Cs;

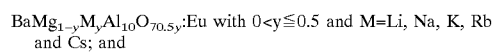

$BaMg_{1-y}M_yAl_{10}O_{70.5y}$:Eu with $0<y\leq 0.5$ and M=Li, Na, K, Rb and Cs; and

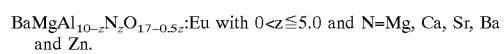

$BaMgAl_{10-z}N_zO_{17-0.5z}$:Eu with $0<z\leq 5.0$ and N=Mg, Ca, Sr, Ba and Zn.

2. A plasma display as claimed in claim 1, characterized in that the blue-emitting phosphor comprises 1 to 30 mole % europium(II).

3. A phosphor chosen from the group of doped europium (II)-activated barium-magnesium aluminates with the general formula

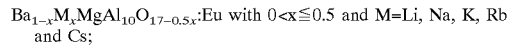

$Ba_{1-x}M_xMgAl_{10}O_{17-0.5x}$:Eu with $0<x\leq 0.5$ and M=Li, Na, K, Rb and Cs;

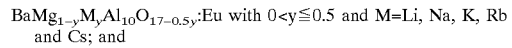

$BaMg_{1-y}M_yAl_{10}O_{17-0.5y}$:Eu with $0<y\leq 0.5$ and M=Li, Na, K, Rb and Cs; and

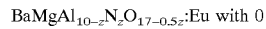

$BaMgAl_{10-z}N_zO_{17-0.5z}$:Eu with 0

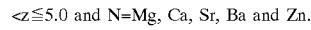

$<z\leq 5.0$ and N=Mg, Ca, Sr, Ba and Zn.

* * * * *